United States Patent
Suzuki et al.

(10) Patent No.: US 8,113,079 B2
(45) Date of Patent: Feb. 14, 2012

(54) DRIVING DEVICE AND IMAGE FORMING APPARATUS

(75) Inventors: Kazuki Suzuki, Kanagawa (JP); Yasuhiro Maehata, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 692 days.

(21) Appl. No.: 12/081,570

(22) Filed: Apr. 17, 2008

(65) Prior Publication Data

US 2008/0282839 A1    Nov. 20, 2008

(30) Foreign Application Priority Data

Apr. 18, 2007    (JP) .................................. 2007-108818

(51) Int. Cl.
*F16H 55/17*    (2006.01)
*F16H 57/04*    (2010.01)

(52) U.S. Cl. ................. 74/434; 74/467; 399/92

(58) Field of Classification Search ........... 74/606 A, 74/413, 434, 467; 399/92, 94
See application file for complete search history.

(56) References Cited

U.S. PATENT DOCUMENTS

| | | | | |
|---|---|---|---|---|
| 6,070,484 | A * | 6/2000 | Sakamaki | 74/434 |
| 6,813,971 | B2 * | 11/2004 | Hagiwara | 74/431 |
| 7,006,777 | B2 * | 2/2006 | Tsunoda et al. | 399/252 |
| 2003/0210922 | A1 * | 11/2003 | Serizawa et al. | 399/96 |

FOREIGN PATENT DOCUMENTS

| | | |
|---|---|---|
| JP | 1-121727 | 8/1989 |
| JP | 07-035221 | 2/1995 |
| JP | 07-332351 | 12/1995 |
| JP | 08-152836 | 6/1996 |
| JP | 09-257048 | 9/1997 |
| JP | 10-337929 | 12/1998 |
| JP | 2000-162841 | 6/2000 |
| JP | 2000-338843 | 12/2000 |
| JP | 2002-257131 | 9/2002 |
| JP | 2002-278363 | 9/2002 |
| JP | 2005-215655 | 8/2005 |
| JP | 3748484 | 12/2005 |
| JP | 2007-292124 | 11/2007 |

OTHER PUBLICATIONS

Machine translation of JP 07-332351.*
Abstract of JP 11-126010 published May 11, 1999.
Office Action dated Jun. 22, 2011 for corresponding Japanese Application No. 2007-108818.

* cited by examiner

*Primary Examiner* — Justin Krause
(74) *Attorney, Agent, or Firm* — Harness, Dickey & Pierce, P.L.C.

(57)    ABSTRACT

A driving device includes a shaft member and a driven gear rotatably disposed to the shaft member that is formed to be fixed to a surface plate member inside the driving device. The shaft member is provided with a flow passage for air penetrating along a shaft line thereof. A cavity is formed in a bearing member of the driven gear to be spaced from the shaft member.

8 Claims, 8 Drawing Sheets

DRIVING DEVICE AND IMAGE FORMING APPARATUS

CROSS-REFERENCE TO RELATED APPLICATIONS

The present application claims priority to and incorporates by reference the entire contents of Japanese priority document 2007-108818 filed in Japan on Apr. 18, 2007.

BACKGROUND OF THE INVENTION

1. Field of the Invention

The present invention relates to a driving device for use in an image forming apparatus.

2. Description of the Related Art

In response to the current space saving and downsizing demand, there is a tendency to mount components in a high-density packaging manner in image forming apparatuses such as coping machines or printers. However, the electric components in the image forming apparatuses radiate exothermic heat while the mechanical components radiate frictional heat, and it is necessary to cool those components by circulating cooling air. High-density packaging makes it difficult to circulate cooling air and therefore adequately cool the heat radiating components. Moreover, in small image forming apparatus, because heat is confined to a small area, there are greater chances of rise in temperature inside the image forming apparatus. In other words, reliability of image forming apparatuses can drop with the downsizing.

FIG. 13 is a sectional view of a conventional driving device. The driving device includes a shaft 201 that supports a gear 202 rotatably. The gear 202 is fixed to a bearing boss member 203, and a contact surface 202a, which contacts with the shaft 201, is formed inside the gear 202. The gear 202 includes two gear members 202b and 202c having respectively different diameters. Frictional heat is generated between the shaft 201 and the contact surface 202a of the gear 202 and between the gear 202 and the bearing boss member 203, and temperatures of the shaft 201 and the gear 202 rise.

Linear expansion of the shaft 201 and the gear 202 can occur due to such rise in the temperature, and relative positions of the shaft 201 and the gear 202 can deviate from the original positions. This can lead to acceleration of wear of the shaft and the gear, lowing of the efficiency of force coupling, and lowering of the overall reliability of the image forming apparatus.

Japanese Patent Application Laid-open No. H8-152836 discloses a gear that includes a helical vane member therein to intake, discharge, and cool an air by rotation. Japanese Patent Application Laid-open No. H7-332351 discloses a supporting structure for supporting a rotor, whose shaft is made into cylindrical shape, to cool a frictional heat generated from rotation of a gear. Japanese Patent Application Laid-open No. H9-257048 discloses a cooling structure for cooling a driving device that generates an air flow toward a bearing by rotating a gear with a vane and cools a heating area.

One approach to lower the friction between parts could be to use a ball bearing; however, use of a ball bearing increase the costs.

The technology disclosed in Japanese Patent Application Laid-open No. H8-152836 relates to cooling of a mating area of a gear, but the technology is unable to cool the entire gear or to cool a sliding surface between the gear and a shaft. On the other hand, the technology disclosed in Japanese Patent Application Laid-open No. H7-332351 is limited to a gear with a hollow shaft, and therefore, cannot be applied to a bearing having no hollow portion. Finally, the technology disclosed in Japanese Patent Application Laid-open No. H9-257048 requires that a vane to be added to a gear, which leads to increase in the costs.

SUMMARY OF THE INVENTION

It is an object of the present invention to at least partially solve the problems in the conventional technology.

According to an aspect of the present invention, there is provided a driving device including a surface plate member; a shaft member attached to the surface plate member; and a gear rotatably supported by the shaft member via a bearing member. The shaft member is provided with an air flow passage along a length thereof, and a cavity is formed between the shaft member and the bearing member.

According to another aspect of the present invention, there is provided an image forming apparatus that includes the above driving device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described below in detail while referring to the accompanying drawings.

Figure 1:
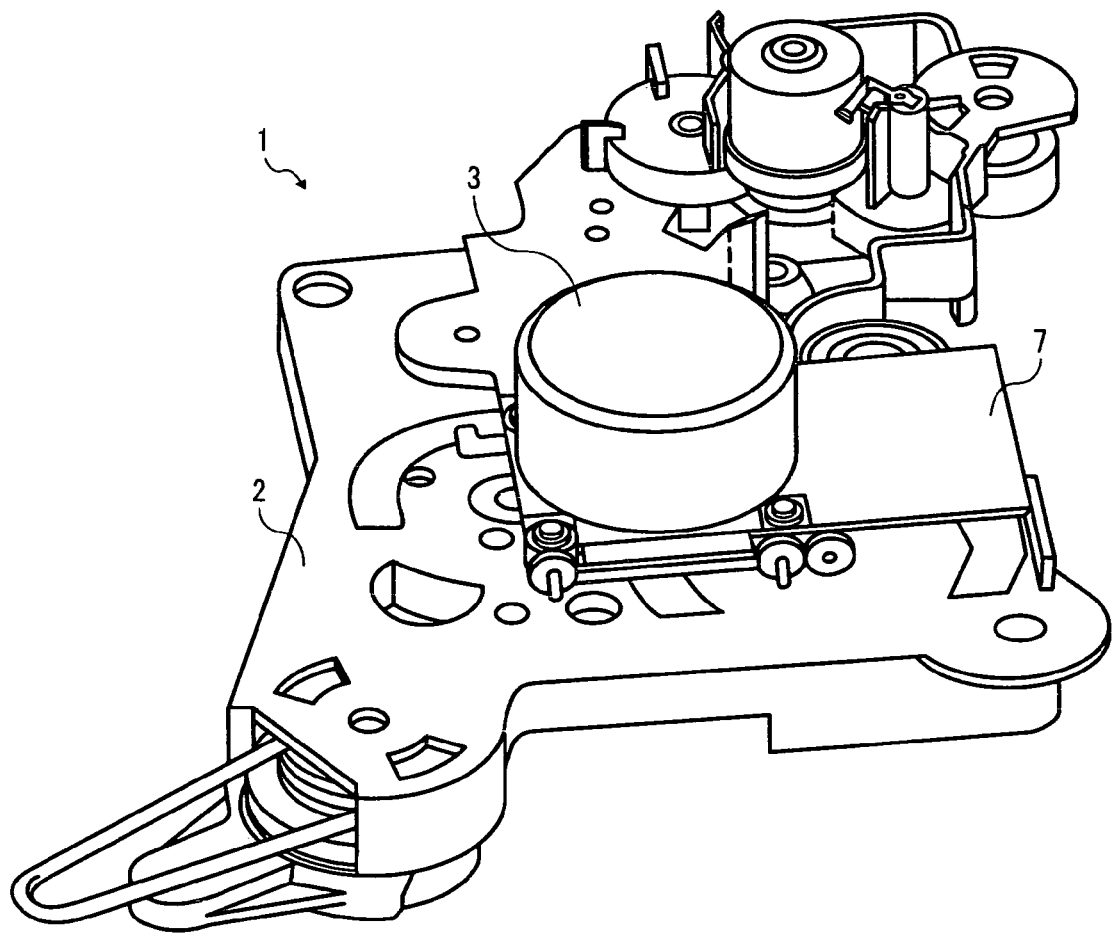
FIG. 1 is a perspective view of a configuration of a driving device according to an embodiment of the present invention.
Figure 2:
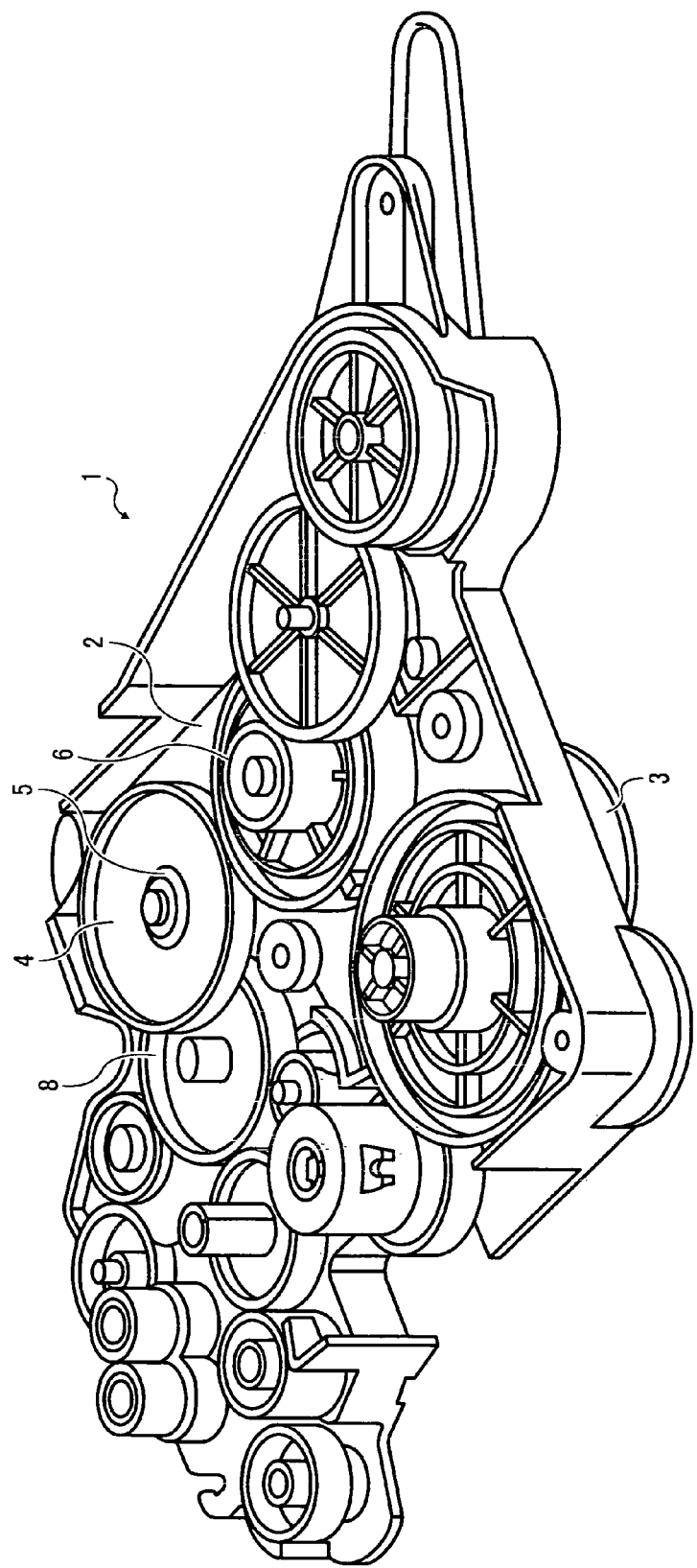
FIG. 2 is a perspective view of the driving device shown in FIG. 1 from a different direction.

A driving device according to a first embodiment of the present invention is described below in detail. The driving device according to the first embodiment can be used in a driving unit in an image forming apparatus. FIGS. 1 and 2 are perspective views from different directions of a driving device 1 according to the first embodiment.

The driving device 1 is configured as a single integrated unit. In the driving device 1, a driving gear 6 is driven with a motor 3. The motor 3 is fixed to a bracket 7 that in turn is mounted on a surface plate member 2. The driving gear 6 rotates a driven gear 4. The driven gear 4 is rotatably fit to a shaft member 5 and mates with another gear 8. The shaft member 5 is firmly fixed to the surface plate member 2. Particularly, an air flow passage is provided in the shaft member to cool the driving device.

Figure 3:
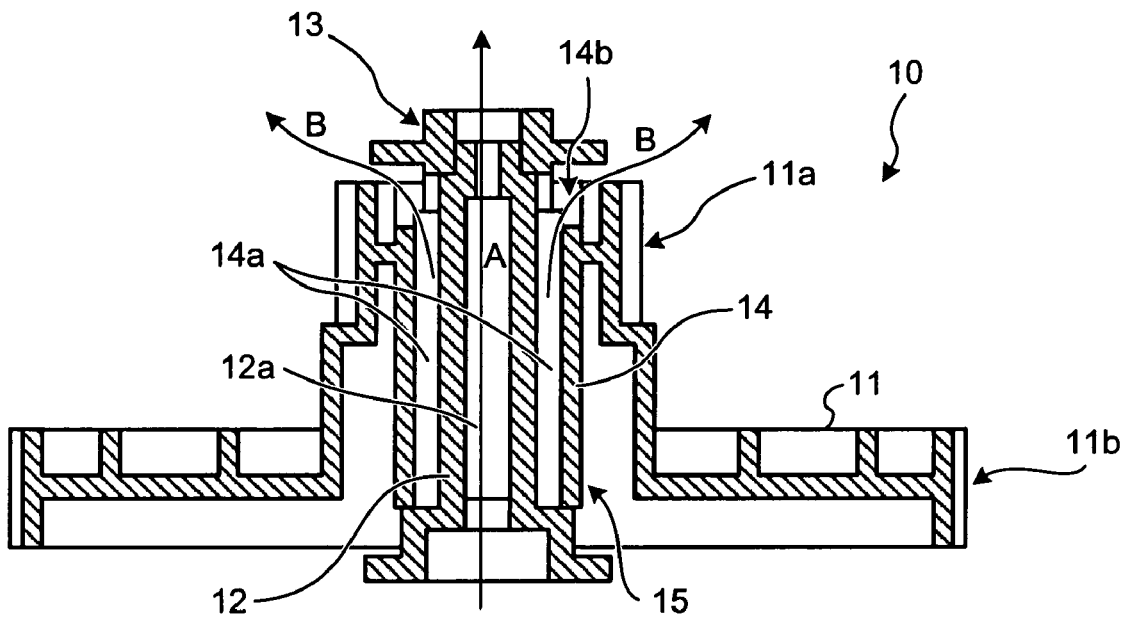
FIG. 3 is a sectional view of a configuration of a driving device according to a first embodiment of the present invention.
Figure 4:
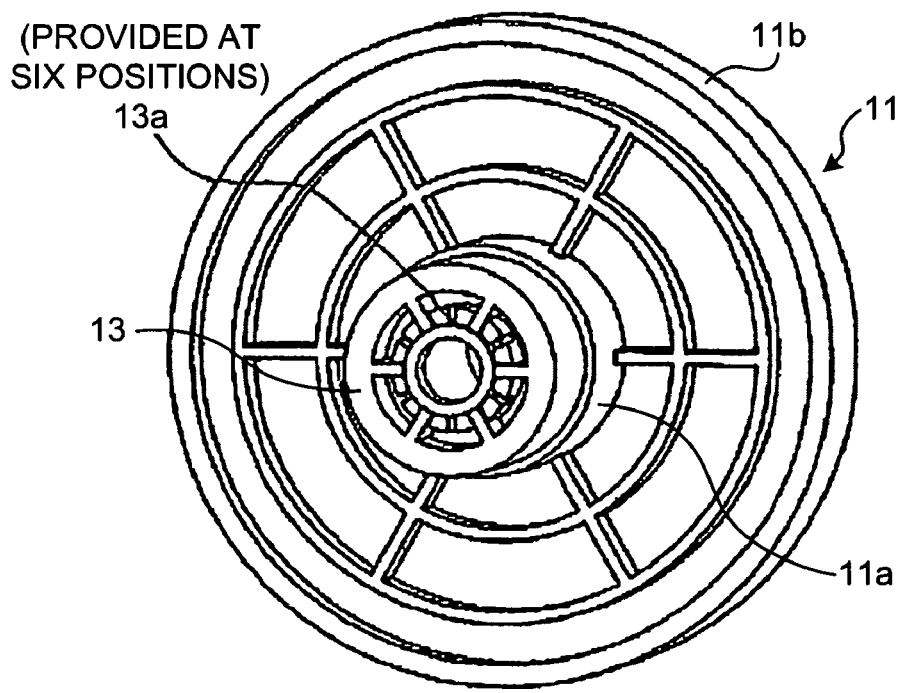
FIG. 4 is a perspective view of a driven gear shown in FIG. 3.

A driving device 10 according to a first embodiment of the present invention will be described below in detail. FIG. 3 is a sectional view of the driving device 10 and FIG. 4 is a perspective view of a driven gear 11 shown in FIG. 3. The driving device 10 includes the driven gear 11 connected to a shaft member 12 at a bearing member 14. The driven gear 11 includes two gear members 11a and 11b having different diameters. The driven gear 11 is rotatably fixed to a shaft member 12 via a bearing member 14. Moreover, A web member 13 is attached to the shaft member 12. The bearing member 14 is supported by a bearing 15 that is mounted at one side of the shaft member 12 (downward side in FIG. 3) and at the same time rotatably supported by the web member 13 that is disposed at the other side of the shaft member 12 (upward side in FIG. 3).

The bearing member 14 is provided with a cavity. Specifically, a cavity 14a is secured between the bearing member 14 and the shaft member 12. Moreover, a plurality of communicating holes 14b are provided that connect the cavity 14a to the outside. Outside air B can enter into the cavity 14a, or air B inside the cavity 14a to go to the outside via these communicating holes 14b. The cavity 14a is provided around the entire periphery of the bearing member 14. Alternatively, a grooved portion may be provided along a shaft line of the shaft member 12 around an inner periphery of the bearing member 14.

Moreover, a flow passage 12a is formed in the shaft member 12 along the length of the shaft member 12. Air A is passed through this flow passage 12a. Furthermore, the web member 13 is provided with six holes 13a, as shown in FIG. 4, to discharge air B flown from communicating holes 14b.

Thus, in the driving device 10, the driven gear 11 and the shaft member 12 are cooled by airs A and B. As a result, the driving device 10 can be cooled effectively. Consequently, the durability of the driven gear 11 and the reliability of the image forming apparatus can be improved.

Figure 5:
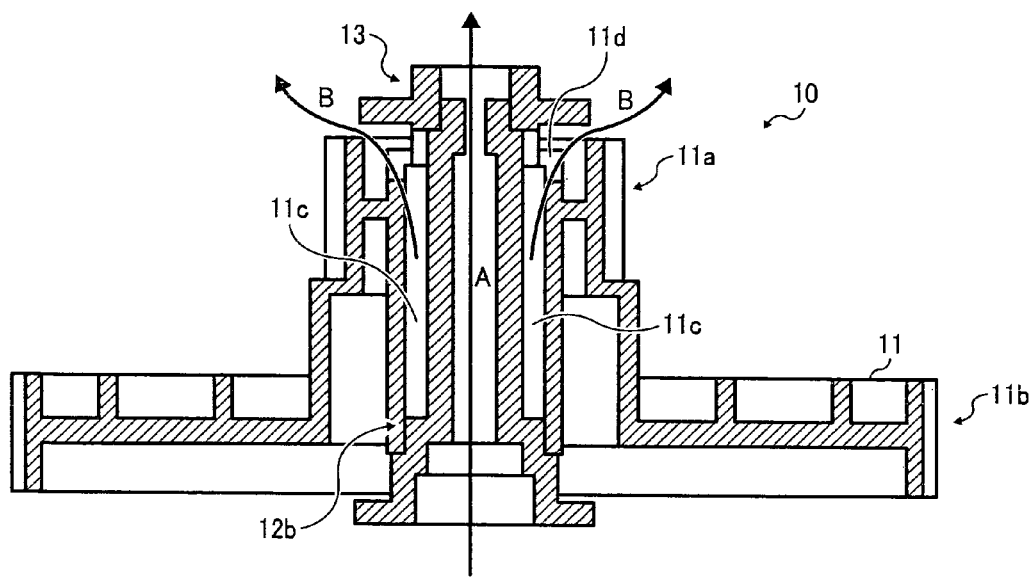
FIG. 5 is a sectional view of a configuration of a driving device according to a second embodiment of the present invention.

FIG. 5 is a sectional view of a configuration of a driving device according to a second embodiment of the present invention. In the driving device 10 according to the second embodiment, the shaft member 12 has a second shaft sliding member 12b on its base. Other configurations are the same as the driving device 10 according to the first embodiment. The second shaft sliding member 12b is formed to have a larger diameter than other area of the shaft member 12, mating with a bearing member 14 of the driven gear 11, and rotatably supporting the driven gear 11. The driven gear 11 and the shaft member 12 are cooled by airs A and B. As a result, the driving device 10 can be cooled effectively. Consequently, the durability of the driven gear 11 and the reliability of the image forming apparatus can be improved. In addition, because the shaft member 12 holds the driven gear 11 without a bearing member, the number of parts can be reduced.

Figure 6:
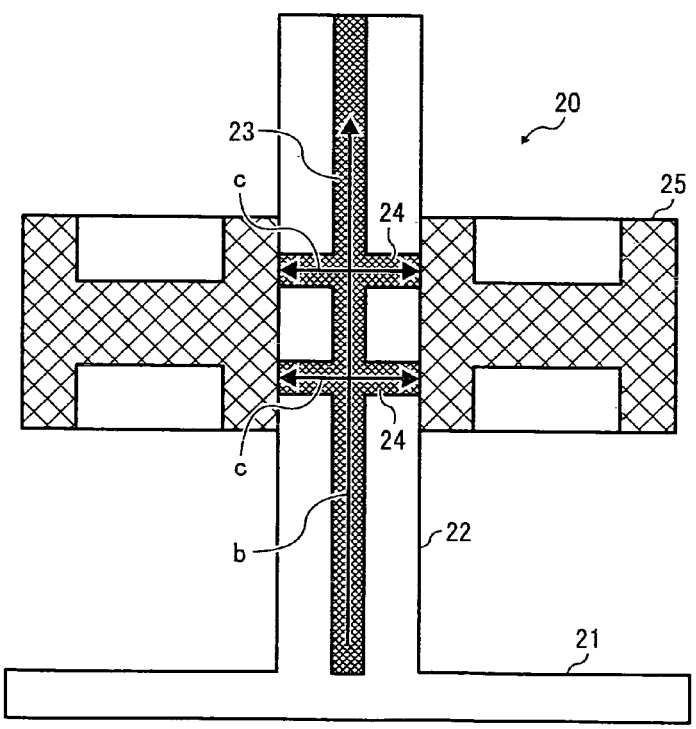
FIG. 6 is a schematic sectional view of a configuration of a driving device according to a third embodiment of the present invention.

FIG. 6 is a schematic sectional view of a configuration of a driving device 20 according to a third embodiment of the present invention. In the driving device 20, a shaft member 22 and a plate member 21 are formed integrally or the shaft member 22 is firmly fit to the plate member 21. Moreover, the shaft member 22 rotatably holds a driven gear 25. The plate member 21 and the shaft member 22 can be respectively made from metal or synthetic resin. A flow passage 23 is formed in the shaft member 23 along the length of the shaft member 23. Annular flow passages 24 are formed in the shaft member 23 in an area where the shaft member 23 is in contact with the driven gear 25. In addition, although not shown specifically, flow passages are formed inside the shaft member 22 in the same manner as in the driving device 10 according to the first embodiment.

Thus, air b passes through the flow passage 23, air c passes through the annular flow passage 24, and air passes through inside the shaft member 22. In other words, the shaft member 22 and the driven gear 25 are cooled by airs b and c. Furthermore, heat from the driven gear 25 is conducted to the shaft member 22 and cooled. The shaft member 22 is cooled by an internal air flow. As a result, the driving device 20 can be cooled effectively. Consequently, the durability of the driven gear 11 and the reliability of the image forming apparatus can be improved.

Figure 7:
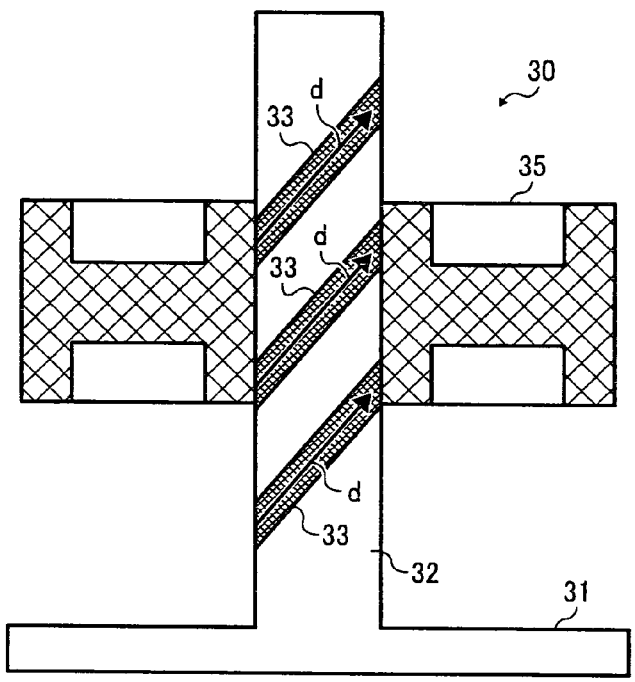
FIG. 7 is a schematic sectional view of a configuration of a driving device according to a fourth embodiment of the present invention.

FIG. 7 is a schematic sectional view of a configuration of a driving device 30 according to a fourth embodiment of the present invention. In the driving device 30, a shaft member 32 and a plate member 31 are formed integrally or the shaft member 32 is firmly fit to the plate member 31. Moreover, the shaft member 32 rotatably holds a driven gear 35. The plate member 31 and the shaft member 32 can be respectively made from metal or synthetic resin.

A flow passage 33 in a helically-grooved shape is formed in the shaft member 32. In addition, although not shown specifically, flow passages are formed inside the shaft member 22 in the same manner as in the driving device 10 according to the first embodiment. The flow passage 33 is also formed in an area where the shaft member 33 is in contact with the driven gear 35.

Thus, air d passes through the flow passage 33, and an air flow passes through inside the shaft member 32. In other words, the shaft member 32 and the driven gear 35 are cooled by the air flow d. Furthermore, heat from the driven gear 35 is conducted to the shaft member 32 and cooled. As a result, the driving device 30 can be cooled effectively. Consequently, the durability of the driven gear 35 and the reliability of the image forming apparatus can be improved.

Figure 8:
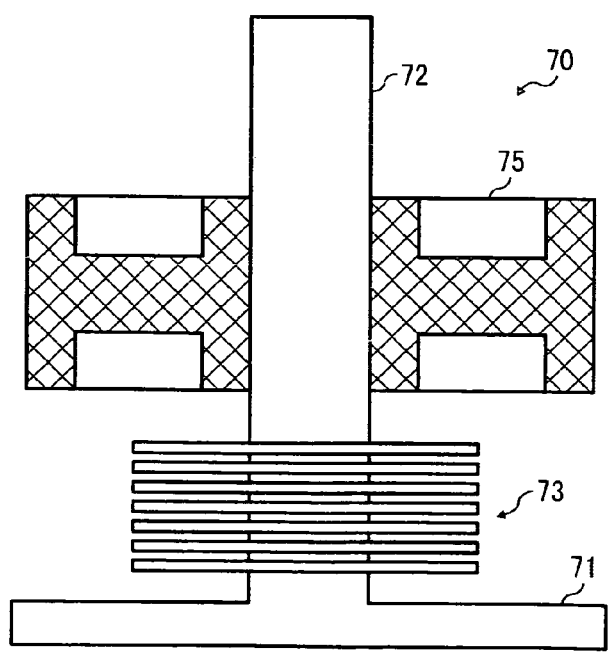
FIG. 8 is a schematic sectional view of a configuration of a driving device according to a fifth embodiment of the present invention.

FIG. 8 is a schematic sectional view of a configuration of a driving device 70 according to a fifth embodiment of the present invention. In the driving device 70, a shaft member 72 and a plate member 71 are formed integrally or the shaft member 72 is firmly fit to the plate member 71. The plate member 71 and the shaft member 72 can be respectively made from metal or synthetic resin. The shaft member 72 rotatably holds a driven gear 75. Between the driven gear 75 and the shaft member 72, one or more cavities described in any one of the first to fourth embodiments is formed. In addition, although not shown specifically, flow passages are formed inside the shaft member 72 in the same manner as in the driving device 10 according to the first embodiment.

Moreover, the shaft member 72 is provided with a plurality of fins 73 in a portion between the driven gear 75 and the plate member 71. The fins 73 are preferably made from a metal with good heat conductivity such as aluminum. Heat generated from the shaft member 72 and the driven gear 75 is discharged from an air flow passing through a cavity between the driven gear 75 and the shaft member 72, and a flow passage inside the shaft member 72, as well as from the fins 73. As a result, the driving device 70 can be cooled effectively. Consequently, the durability of the driven gear 75 and the reliability of the image forming apparatus can be improved.

Figure 9:
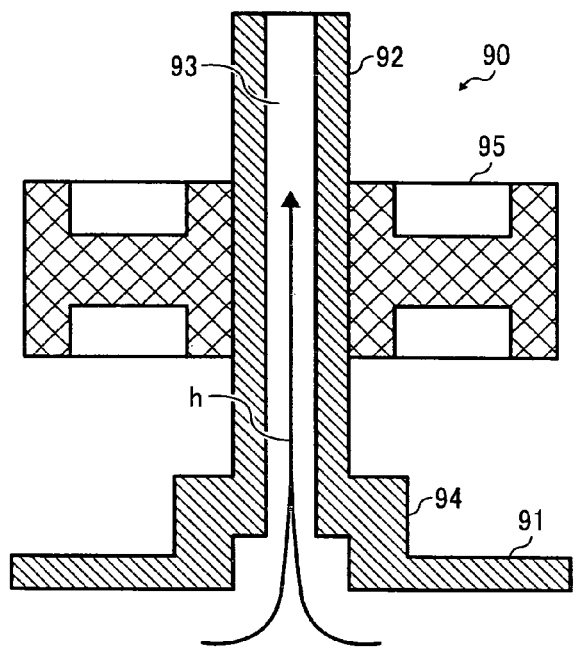
FIG. 9 is a schematic sectional view of a configuration of a driving device according to a sixth embodiment of the present invention.

FIG. 9 is a schematic sectional view of a configuration of a driving device 90 according to a sixth embodiment of the present invention. In the driving device 90, a shaft member 92 and a plate member 91 are formed integrally. Moreover, the shaft member 92 rotatably holds a driven gear 95. The plate member 91 and the shaft member 92 can be respectively made from metal or synthetic resin. In the driving device 90, between the driven gear 4 and the shaft member 72, one or more cavities described in any one of the first to fourth embodiments (not shown) is formed.

The shaft member 92 has a flow passage 93 therein and an enlarged diameter member 94 attached to a joint to the plate member 91 so that air h can pass through the flow passage 93. The diameter of the flow passage at the side of the plate member 91 is enlarged corresponding to that of enlarged diameter member 94. Therefore, an internal area of the flow passage 93 becomes larger and cooling capability is improved. According to the sixth embodiment, by mounting the enlarged diameter member 94, a surface area of the shaft member 92 is enlarged to improve heat radiation, and by enlarging an area of an opening 95, through which an air flow passes, at the flow passage 93 of the shaft member 92, the air is allowed to flow in more easily. The driven gear 95 and the shaft member 92 are cooled by the air passing through the cavity and the flow passage in the shaft member 92. The shaft member 92 is also cooled by air h. As a result, the driving device 90 can be cooled effectively. Consequently, the durability of the driven gear 95 and the reliability of the image forming apparatus can be improved.

Figure 10:
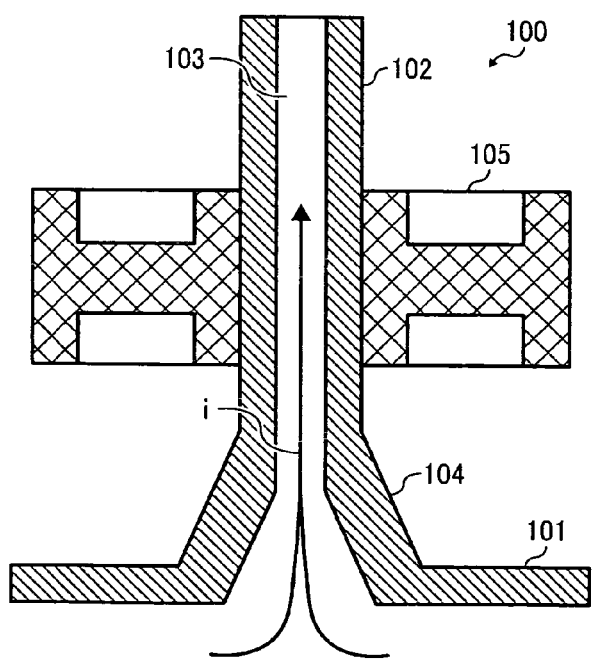
FIG. 10 is a schematic sectional view of a configuration of a driving device according to a seventh embodiment of the present invention.

FIG. 10 is a schematic sectional view of a configuration of a driving device 100 according to a seventh embodiment of the present invention. In the driving device 100, a shaft member 102 and a plate member 101 are formed integrally. Moreover, the shaft member 102 rotatably holds a driven gear 105. The plate member 101 and the shaft member 102 can be respectively made from metal or synthetic resin. Between the driven gear 105 and the shaft member 102, a cavity described in any one of the first to fourth embodiments (not shown) is formed.

The shaft member 102 has a flow passage 103 penetrating the shaft member 102 along a shaft line thereof as well as has a tapered enlarged diameter member 104 expanding toward the plate member 101 at the joint to the plate member 101 so that air i can pass through the flow passage 103. The flow passage 103 is expanding toward the plate member 101 side. Therefore, an internal area of the flow passage 103 becomes larger and cooling capability is improved. Because of the presence of the enlarged diameter member 104, a surface area of the shaft member 102 is enlarged to improve heat radiation, and by enlarging an area of an opening 105, through which an air flow i passes, at the flow passage 103 of the shaft member 102, the air is allowed to flow in more easily.

The driven gear 105 and the shaft member 102 are cooled by the air flow passing through the cavity and the flow passage in the shaft member 102. The shaft member 102 is also cooled by the air i, and heat from the driven gear 105 that is held in contact with the shaft member 102 is conducted to the shaft member 102 and cooled. As a result, the driving device 100 can be cooled effectively. Consequently, the durability of the driven gear 105 and the reliability of the image forming apparatus can be improved.

Figure 11A:
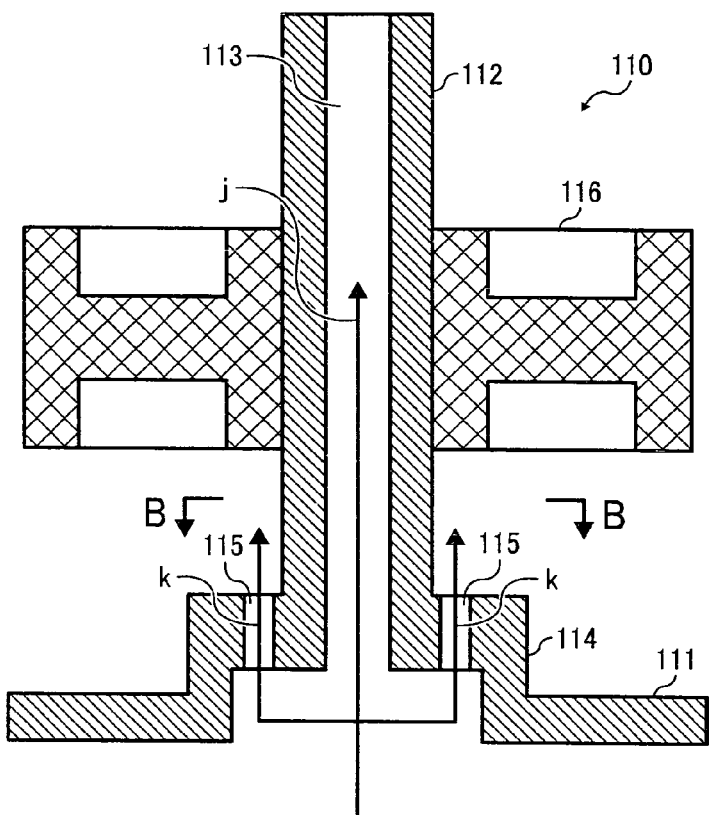
FIG. 11A is a schematic sectional view of a configuration of a driving device according to an eighth embodiment of the present invention.
Figure 11B:
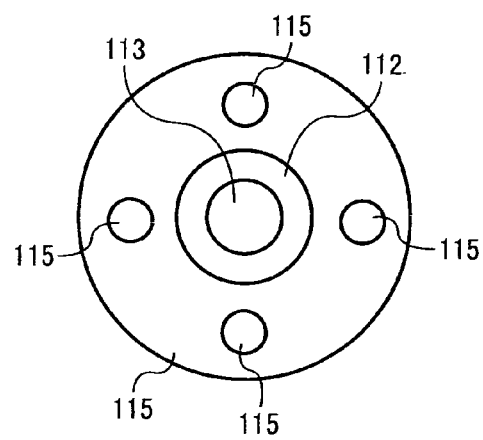
FIG. 11B is an end view taken along a line B-B of FIG. 11A.

FIG. 11A is a schematic sectional view of a configuration of a driving device 110 according to an eighth embodiment of the present invention; and FIG. 11B is an end view taken along a line B-B of FIG. 11A. In the driving device 110, a shaft member 112 and a plate member 111 are formed integrally. Moreover, the shaft member 112 rotatably holds rotatably holds the above-described driven gear 116. The plate member 111 and the shaft member 112 can be respectively made from metal or synthetic resin. Between the driven gear 116 and the shaft member 112, one or more cavities described in any one of the first to fourth embodiments (not shown) is formed.

The shaft member 112 has a flow passage 113 penetrating the shaft member 112 along a shaft line thereof as well as an enlarged diameter member 114 attached to a joint to the plate member 111. The enlarged diameter member 114 has through-holes 115 communicating both sides of the plate member 111. Air j passes through the flow passage 113, and at the enlarged diameter member 114 air k pass through the through-holes 115 toward the driven gear 116. Because of the presence of the enlarged diameter member 114, a surface area of the shaft member 112 is enlarged to improve heat radiation, and by enlarging an area of an opening 116, through which air j passes, at the flow passage 113 of the shaft member 112, the air is allowed to flow in more easily.

Thus, the driven gear 116 and the shaft member 112 are cooled by the air passing through the cavity and the flow passage in the shaft member 112. The shaft member 112 is also cooled by air j, and heat from the driven gear 116 held in contact with the shaft member 112 is conducted to the shaft member 112 and cooled. The driven gear 116 is also cooled by air k flowing from the through-holes 115. As a result, the driving device 110 can be cooled effectively. Consequently, the durability of the driven gear 116 and the reliability of the image forming apparatus can be improved.

Figure 12:
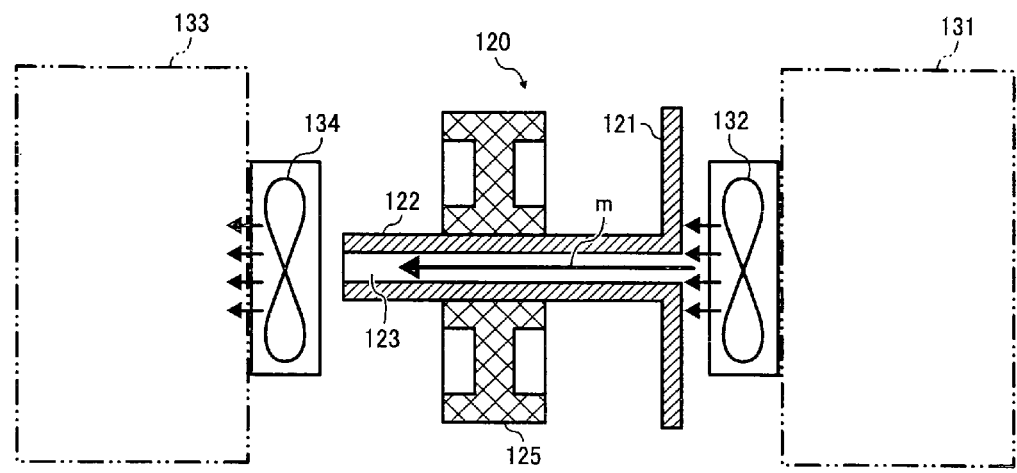
FIG. 12 is a schematic sectional view of a configuration of a driving device according to a ninth embodiment of the present invention.
Figure 13:
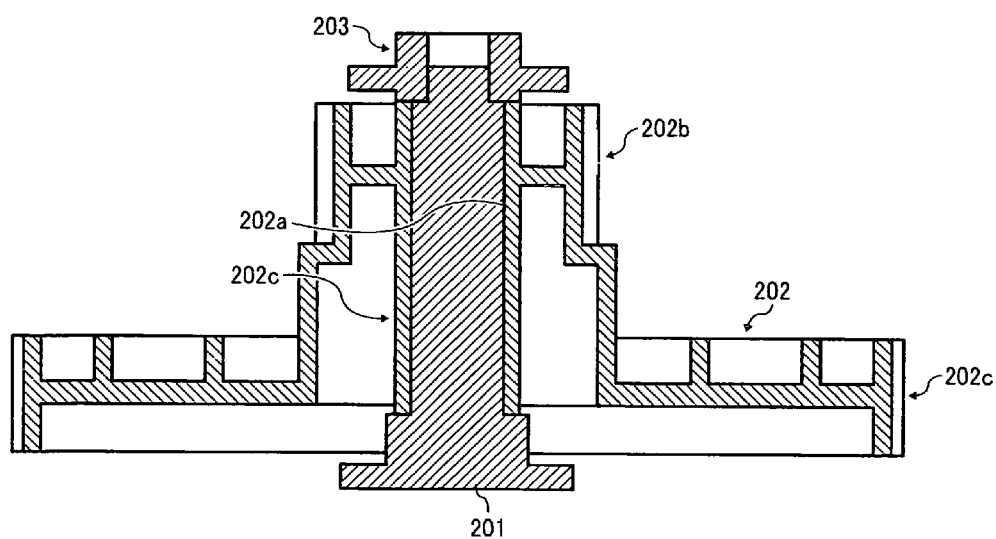
FIG. 13 is a sectional view of a conventional driving device.

FIG. 12 is a schematic sectional view of a configuration of a driving device 120 according to a ninth embodiment of the present invention. The driving device 120 according to the ninth embodiment is disposed between a device 131 and a device 133. The device 131 includes a fan 132, and the device 133 includes a fan 134. Both fans 132 and 134 respectively blow an air from the device 131 to the device 133. A shaft member 122 and a plate member 121 are formed integrally, or the shaft member 122 is firmly fit to the plate member 121. The shaft member 122 is extends between the devices 131 and 133, and the shaft member 122 rotatably holds a driven gear 125. The plate member 121 and the shaft member 122 can be respectively made from metal or synthetic resin. Between the driven gear 4 and the shaft member 122, one or more cavities described in any one of the first to fourth embodiments (not shown) is formed.

The shaft member 122 includes a flow passage 123 that penetrates the shaft member 122 along a shaft line thereof, and an air flow m generated by the fans 132 and 134 passes through the flow passage 123.

Thus, the driven gear 125 and the shaft member 122 are cooled by the air flow passing through the cavity and the flow passage in the shaft member 122. The shaft member 122 is also cooled by the air flow m, and heat from the driven gear 125 held in contact with the shaft member 122 is conducted to the shaft member 122 and cooled. As a result, the driving device 120 can be cooled effectively. Consequently, the durability of the driven gear 125 and the reliability of the image forming apparatus can be improved.

Fans can be disposed at both sides of the driving device, or a fan can be disposed at only one side of the driving device. Moreover, it is possible to replace the driving device 120 with any one of the driving devices according to the first to the eighth embodiments.

According to an aspect of the present invention, it is possible to effectively cool a shaft member and a gear. Consequently, it is possible to increase the durability and the reliability of the parts of the driving device and the image forming apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving device, comprising:
   a surface plate member;
   a shaft member attached to the surface plate member; and
   a gear rotatably supported by the shaft member, the gear including:
   a web member attached to the shaft member, and
   a bearing member provided with a cavity formed between the shaft member and the bearing member,
   wherein the web member is provided with a communicating hole connected to the cavity so that air within the cavity is discharged outside of the web member.

2. The driving device according to claim 1, wherein the shaft member is provided with a grooved flow passage on an outer periphery thereof in a region where the shaft member is in contact with the gear.

3. The driving device according to claim 1, wherein the gear includes two gear members having different diameters.

4. The driving device according to claim 1, wherein the web member is attached to the shaft at a portion of the shaft opposite a bearing which supports the bearing member.

5. The driving device according to claim 1, wherein the cavity is provided around an entire periphery of the bearing member.

6. The driving device according to claim 1, wherein the communicating hole has a plurality of communicating holes.

7. The driving device according to claim 6, wherein the plurality of communicating holes is provided with six holes.

8. An image forming apparatus comprising a driving device, the driving device including:
   a surface plate member;
   a shaft member attached to the surface plate member; and
   a gear rotatably supported by the shaft member, the gear including:
   a web member attached to the shaft member, and
   a bearing member provided with a cavity formed between the shaft member and the bearing member,
   wherein the web member is provided with a communicating hole connected to the cavity so that air within the cavity is discharged outside of the web member.

* * * * *